Dec. 2, 1969   J. P. CHERNOCH   3,482,186
LASER OSCILLATOR WITH SINGLE TRANSVERSE MODE OUTPUT
Filed June 14, 1967

Inventor:
Joseph P. Chernoch
by *John F. Aheen*
His Attorney.

3,482,186
LASER OSCILLATOR WITH SINGLE TRANSVERSE MODE OUTPUT

Joseph P. Chernoch, Scotia, N.Y., assignor to General Electric Company, a corporation of New York
Filed June 14, 1967, Ser. No. 646,020
Int. Cl. H01s 3/05
U.S. Cl. 331—94.5                                   8 Claims

ABSTRACT OF THE DISCLOSURE

A laser oscillator has a folded confocal geometry with a spherical mirror and an exit etalon, the total optical path length between the two being one half the radius of curvature of the spherical mirror, making allowance for the refractive index of the laser rod in determining the physical separation. A pair of apertures are each one respectively located adjacent the spherical mirror and the exit etalon, and within the optical path, and are of such diameter as to pass only the lowest order transverse mode of oscillation.

THE DISCLOSURE

Figure 1:
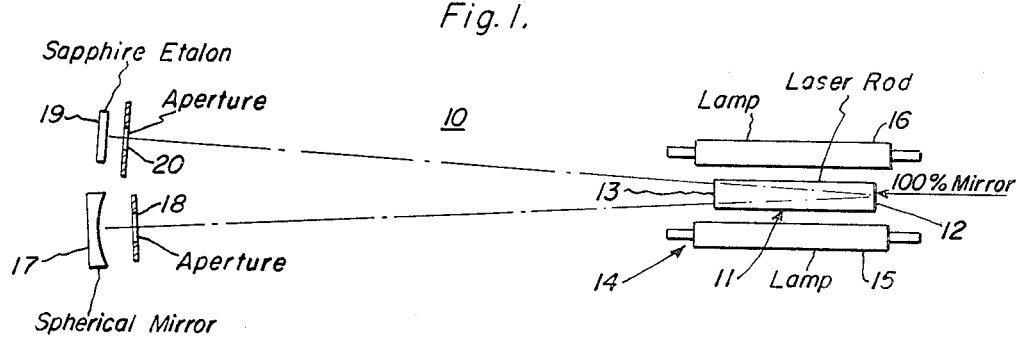

The present invention relates to a laser oscillator system, and more particularly to such a system wherein the output beam constitutes a plane-parallel diffraction limited beam of coherent optical radiation containing only a single transverse mode of oscillation.

Laser devices, now well known to the art, are devices which generate, or amplify, and emit coherent electromagnetic radiation at higher frequencies than microwave frequencies, generally in the infrared and visible portions of the electromagnetic spectrum. For the purposes of this description, such wavelengths of radiation are to be denominated as "optical radiation." The light emission from a laser device is characterized by a narrow band of wavelength, i.e. the light is essentially monochromatic, and by its spatial coherence or in-phase relationship.

Because of the coherence of the emission of laser devices, laser beam divergence is generally small and such beams are adapted to transmit high energies for great distances. Laser devices may be fabricated from any active medium in which a population inversion may be established by suitable "pumping." Some such active laser media are neodymium-doped glass, ruby, carbon dioxide, and helium-neon gaseous mixtures, to mention only a few.

Coherent emission in laser devices requires a population inversion, a condition which exists when a substantial number of the possible atomic or molecular radiating species in the active laser medium are raised to a metastable energy state above the ground state of the species. When this condition exists, an incident photon of the laser emission wavelength may stimulate a radiative transition from a metastable level to a lower level, which may or may not be the ground state of the species. Such radiative transitions are cumulative and self-sustaining, resulting in the emission of radiation which is coherent and in-phase. Population inversion is, for example, achieved by an irradiation of the laser medium with a high intensity of electromagnetic radiation at a wavelength of appropriate energy to raise the radiating specie to a metastable state when the radiation is absorbed thereby. Such inversion causing radiation is referred to as "pumping radiation" and the wavelength of the pumping or activating radiation is known as the "pumping" wavelength.

Laser oscillators, as opposed to laser amplifiers, generally include a resonant structure constituting a pair of at least partially reflecting surfaces that are substantially parallel with the wave-front of the coherent radiation propagated therebetween so that radiation generated by stimulated emission may have an opportunity to build up in intensity by causing a large number of in-phase radiative transitions to occur. Generally one of the reflecting surfaces is partially transmissive so that, while oscillation occurs within the resonant structure, a portion of the energy in the form of coherent optical radiation is emitted therethrough as a beam of coherent radiation.

Conventional laser oscillators normally tend to oscillate in many transverse modes, producing a multi-phase output that results in an output beam that is highly divergent. For most applications, the smallest possible beam divergence is desirable.

Accordingly, it is an object of the present invention to provide a laser oscillator capable of producing a beam of coherent radiation having a minimum divergence, Yet another object of the present invention is to provide a laser oscillator which emits a collimated beam of coherent optical radiation having high power output, Yet another object of the present invention is to provide a laser oscillator capable of producing a high powered beam of convergent, coherent optical radiation and utilizing as small a physical space as is possible.

Briefly stated, in accord with the present invention, I provide a laser oscillator system having a folded confocal geometry utilizing a spherical mirror and a planar etalon separated by an optical path which is one-half of the radius of curvature of the spherical mirror. A mirror adjacent one end of the laser body is substantially completely reflective to optical radiation at the laser wavelength and the laser oscillations pass through the laser body at least twice the number of times as would occur without the folded configuration. A pair of apertures are located adjacent each of the spherical mirror and the exit etalon to limit the radiation transmitted thereby to the lowest transverse mode of oscillation, thus attaining the smallest possible beam divergence in the output thereof.

Figure 2:
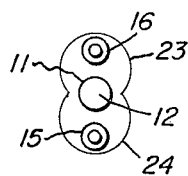
Figure 3:
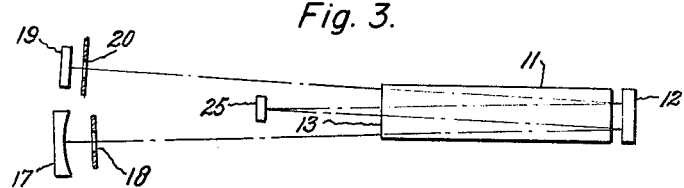

The novel features believed characteristic of the present invention are set forth in the appended claims. The invention itself, together with further objects and advantages thereof, may best be understood by reference to the following description taken in connection with the appended drawings in which:

FIGURE 1 is a schematic representation of the optical system utilized to produce a highly convergent laser beam in accord with the present invention, FIGURE 2 is a schematic cross-sectional view of the relationship of the laser body to the pumping means therefor, and FIGURE 3 is a schematic representation of alternative structure to that of FIGURE 1 in accord with the invention.

In FIGURE 1 a laser oscillator, represented generally as 10, includes a laser body 11 of an optically active laser material and having a pair of opposed, substantially parallel faces 12 and 13. A pumping means 14 comprises a pair of xenon discharge flash lamps 15 and 16 and are juxtaposed in substantial parallelism with laser body 12. The first face 12 of laser body 11 is coated with a plurality of dielectric films which provide a substantially completely reflecting surface to the wavelength of the desired mode of oscillation. Alternatively, a separated mirror may be used, and the face 12 may be uncoated or low-reflection coated. In all instances the reflecting surface will be referred to herein as "adjacent said laser body." The second face 13 of laser body 11 is uncoated or coated with a suitable low reflectance film to minimize reflections, as is well known in the art.

A spherical mirror 17 having a first aperture 18 in close juxtaposition thereto is located at an optical path of approximately one-quarter of its radius of curvature from active face 12 of laser body 11. The optical path length in any given medium is the actual length divided by its index of refraction. In a path through several media, the optical path length through all is the sum of the individual optical path lengths. A planar etalon 19 having a closely juxtaposed second aperture 20 is also located at an optical path length distance of approximately one-quarter of the radius of curvature of spherical mirror 17 from active face 12 of laser body 11. Spherical mirror 17 is located so that a radius drawn from the surface thereof to the center of face 12 of laser body 11 must pass through face 13 of body 11. Similarly, the normal to exit etalon 19, in passing to the center of face 12 of laser body 11 must pass through face 13. This means that laser face 13 creates an aperture through which the radius of spherical mirror 17 and the normal to exit etalon 19 must pass in order that cumulative reflections may occur and the generation of coherent optical oscillations may occur.

It is possible to have oscillations between the etalon and the spherical mirror utilizing the reflecting face 12 to fold the optical path length, because the phase front at the midpoint of a confocal geometry is a plane wave, thereby permitting the use of an etalon, rather than a plane mirror. Apertures 18 and 20, closely juxtaposed to spherical mirror 17 and etalon 19, respectively, are each provided with an aperture diameter which is related to the mode diameter of the lowest mode of oscillation of the material from which laser 11 is fabricated. Similarly, the aperture of face 13 and the possible angular relationships of the radius of spherical mirror 16 and the normal of etalon 19 to the normal to the center of active face 12 are related to the diameter and length of laser body 11. As described above etalon 19 and spherical mirror 17 are the same distance from surface 12. In the broad concept this is not necessary. The distance may be different, provided that the total optical path length between them is one-half the radius of curvature of mirror 17.

In one specific example of a device constructed in accord with this illustrated embodiment of the present invention, a laser rod of 2% neodymium-doped Eastern Kodak N.D. 11 silicate glass was optically pumped by two 12″ length FX-47 xenon flashlamps. The neodymium glass rod had a length of 13″ and a diameter of ½″, causing the full angle of the aperture to be approximately 2°, thus allowing a symmetrical arrangement of spherical mirrors 17 and etalon 19 to have conjugate angles of 1° apiece from the normal to the center of face 12 of laser body 11. A spherical mirror having a radius of curvature of 4.66 meters and a 100% reflectivity at 1.06 microns (the laser wavelength of the neodymium glass) was utilized as spherical mirror 17. Etalon 19 was of sapphire and had a thickness of 0.125″. Each of spherical mirror 17 and etalon 19 were located an optical path length (not actual distance) of 1.165 meters from the surface 12 of laser body 11. The sapphire etalon 19 provided a reflectivity of approximately 26% at a wavelength of 1.06 microns. If a transparent medium were used rather than sapphire or if a different reflectivity were desired, dielectric reflecting coatings well known in the art may be used. Aperture 18 had a diameter of 4.3 millimeters and aperture 20 had a diameter of 3 millimeters. This is to be contrasted to other mode-selection arrangements utilizing the so-called "pin-hole" aperture, of the order of microns in diameter. Such small apertures must be exposed to extremely high energy densities which result in destruction of the aperture by erosion and may even result in atmospheric breakdown due to high energy densities.

In FIGURE 2 of the drawing the relationship of the laser body 11 and the pumping means 14 is shown in vertical cross-section. In FIGURE 2, xenon flashlamps 15 and 16 are arranged in a double exfocal cavity comprising two cylindrical reflecting surfaces of a radius of ½″ which intersect at a common chord of approximately 1″ to allow for cooling of laser body 11. This exfocal arrangement causes both the center of laser rod 11 and the center of each of the associated pumping lamps 15 and 16, respectively, to be displaced a like distance from the axis of reflecting cylinders 23 and 24 respectively.

Since the lowest transverse mode of oscillation of the neodymium glass, which is desired to be preselected, is 1.06 microns, the calculated mode diameter is found to be 1.7 millimeters. In accord with the present invention, I find it is possible to allow apertures 18 and 20 to be approximately twice the mode diameter and still allow only the lowest, desired mode to be transmitted therethrough. Concurrently with this, I find that increasing the aperture sizes to approximately twice the mode diameter permits the energy output to be substantially greater than if the aperture were made identical with the calculated mode diameter.

In operation, a population inversion is caused within laser body 11 by pulsing flashlamps 15 and 16 with approximately 1000 joules of energy. Stimulated emission occurs and multiple reflections between spherical mirror 17 and exit etalon 19, with reflecting face 12 of laser body 11 folding the optical path length, permits oscillations and the emission of approximately ¼ joule of energy in a 3 millimeter diffraction limited beam with a pulse duration of 125 microseconds. Although certain values for the various parameters are given herein by way of example, it should be appreciated that some of these are dependent upon the active laser body. Similarly, other values are a function of the chosen radius of curvature, which depends upon the use to which the oscillator is to be put. Similarly, power levels may vary as the other parameters may, all within the skill of those well versed in the art.

The folded optical path length has the advantage of causing the optical path to make two or more passes through the laser body of active material. This results in a higher power output from the laser, in that a larger volume of the active laser material is swept by the selected mode volume. This folding also serves to reduce the physical size of the laser by a factor, depending upon the number of times the reflected ray is folded, making practical the use of long resonant optical path lengths with their correspondingly larger mode volumes. This again makes more efficient use of the active laser material by stimulating a larger volume, thereby producing a high power output.

A further feature of the invention utilizing the folded confocal geometry is that the etalon serves to reduce the number of higher order modes because its reflectivity is a maximum at normal incidence for a plane wave and decreases for radiation propagating in other than a plane wave or deviating from the normal. Thus, in addition to mode selection by apertures 18 and 20, etalon 19 further aids by maximizing the reflectance of the lowest order mode and minimizing the reflectance of higher order modes.

In further accord with the invention the optical resonant cavity, i.e. the optical path between the etalon and the spherical mirror, may be folded any number of times, limited only by the diameters of the laser rod and mode diameter. For example, as illustrated in FIGURE 3, an additional plane mirror 25 may be used to fold the optical path length twice, rather than once. Additional plane mirrods may be used as noted above. This increases the volume of active laser medium swept by the beam and greatly increases the laser output. In this embodiment the aperture formed by the near-end of the laser body need not include a ray going to both spherical mirror and the etalon, but only the two surfaces between which a single reflection occurs. Similarly, the focal point of the aperture, in this case, is displaced from the center of the reflecting mirror 12 adjacent the far-end of the laser body.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new an desire to secure by Letters Patent of the United States is:

1. A laser oscillator adapted to emit a collimated beam of coherent optical radiation having only a single preselected transverse mode and comprising:

(a) a body of optically active laser material adapted to be activated to a population inversion
   (b) reflecting means adjacent one end of said body and substantially totally reflective to the emission wavelength of said body
   (c) pumping means closely juxtaposed to said optically active body for irradiating said body with pumping optical radiation which is effective to produce a population inversion in said active body
   (d) a spherical mirror which is substantially totally reflecting to optical radiation at said emission wavelength located at a first given optical distance from said reflecting means, adjacent the opposite end of said laser body from said reflecting means and at an angle to the normal of said face within an aperture created by the other of said faces of said laser body
   (e) a first mode selection aperture closely juxtaposed to said spherical mirror and having a first mode selective aperture diameter for passing only said lowest transverse mode of oscillation of said optically active laser body
   (f) a planar etalon which is partially transmissive to radiation at said emission wavelength disposed at a second given optical distance from said reflecting means, adjacent the opposite end of said laser body from said reflective means and having its normal at an angle to the normal to said reflecting face which angle is within the aperture created by said other face,
   (g) a second mode selection aperture closely juxtaposed to said etalon and having a second mode selection aperture diameter for passing only said lowest mode of oscillation of said laser body,
   (h) said spherical mirror, said laser body and said planar etalon being juxtaposed relative to one another as to constitute a hemifocal resonant structure wherein coherent optical radiation at said emission wavelength is generated within said laser body when stimulated with pumping radiation from said pumping means, and a beam of optical radiation is reflected between said spherical mirror and said etalon, passing through said laser body a plurality of times, traversing an optical path length between said etalon and said spherical mirror that is equal to half the radius of curvature of said spherical mirror, and is incident upon said etalon as a substantially planar wave and transmitted therethrough as a plane-parallel diffraction-limited beam of coherent optical radiation.

2. The laser oscillator of claim 1 wherein said active laser body is a rod of neodymium activated silicate glass.

3. The laser oscillator of claim 1 wherein said etalon is at least partially reflective to optical radiation of said lowest transverse mode.

4. The laser oscillator of claim 1 wherein said first and second apertures are approximately equal to the preselected mode diameter thereat.

5. The laser oscillator of claim 1 wherein said first and second apertures are approximately twice the diameter of the preselected mode thereat.

6. The laser oscillator of claim 1 wherein said first aperture is larger in diameter than said second aperture and each is greater in diameter than the preselected mode thereat.

7. The laser oscillator of claim 1 wherein said first and second given optical path lengths are equal to half the radius of curvature of said spherical mirror.

8. The laser oscillator of claim 1 wherein said beam of optical radiation is further reflected from at least one planar mirror between reflections from said spherical mirror and said etalon and the sum of said first and second given optical distances is less than half the radius of curvature of said spherical mirror.

References Cited

UNITED STATES PATENTS

| | | | |
|---|---|---|---|
| 3,435,370 | 3/1969 | Harris et al. | 331—94.5 |
| 3,286,193 | 11/1966 | Koester et al. | 331—94.5 |

RONALD L. WIBERT, Primary Examiner

P. K. GODWIN, Assistant Examiner